United States Patent [19]

Tustison

[11] 3,898,589

[45] Aug. 5, 1975

[54] PULSE POSITION AND PHASE MODULATOR

[75] Inventor: Galen F. Tustison, Palos Verdes Peninsula, Calif.

[73] Assignee: Hughes Aircraft Company, Culver City, Calif.

[22] Filed: May 2, 1974

[21] Appl. No.: 466,361

[52] U.S. Cl. .................... 332/9 R; 328/58; 328/63; 307/271; 325/38 R

[51] Int. Cl.² .................... H03K 7/04

[58] Field of Search ......... 332/9 R, 9 T; 328/63, 58; 307/271; 325/143, 38 R

[56] References Cited

UNITED STATES PATENTS

| | | | |
|---|---|---|---|
| 3,073,972 | 1/1963 | Jenkins | 328/58 X |
| 3,191,071 | 6/1965 | King et al. | 307/271 X |
| 3,246,260 | 4/1966 | Clayton | 332/9 R |
| 3,384,838 | 5/1968 | Knutrud | 332/9 T |
| 3,693,113 | 9/1972 | Glasser et al. | 328/58 X |
| 3,783,304 | 1/1974 | Fox | 332/9 T X |

OTHER PUBLICATIONS

Noll–"Circuits and Techniques–FET biasing modes" Ham Radio, Nov., 1972, pp. 61, 65 and 66.

*Primary Examiner*—Alfred L. Brody
*Attorney, Agent, or Firm*—W. H. MacAllister, Jr.; W. L. Androlia

[57] ABSTRACT

An electronic circuit for generating pulse position modulation or phase modulation. Pulse position modulation is generated by applying a composite signal, which is the summation of a radio frequency ramp voltage and a modulating voltage, to the input of a fixed threshold trigger circuit. The output pulses of the trigger circuit are of constant magnitude and duration but vary in time in response to the modulating voltage. Phase modulation is generated by passing the output pulses of the trigger circuit through a filter tuned to some odd harmonic of the frequency of said output pulses to recover a phase modulated sinewave.

6 Claims, 3 Drawing Figures

PULSE POSITION AND PHASE MODULATOR

FIELD OF THE INVENTION

This invention relates to modulation circuits and more specifically to pulse position modulation and phase modulation circuits.

DESCRIPTION OF THE PRIOR ART

It is standard practice in communication systems to transmit low frequency signals by modulating them upon a radio frequency carrier wave. One of the earliest modulation schemes was amplitude modulation. Amplitude modulation is undesirable in some applications because the receiver is very sensitive to amplitude variations in the received signal, such as those caused by noise. To overcome this deficiency, angle modulation and pulse position modulation, both of which are inherently insensitive to amplitude variations, are often employed.

Various forms of angle modulation exist in the prior art. One of these forms is phase modulation. Furthermore, various methods of generating phase modulation exist in the prior art. One method of phase modulation utilizes a variable reactance which varies in response to the applied modulating signal. The variable reactance element may take the form of either a transistor as in U.S. Pat. No. 3,112,457 issued to I. Szalay et al. on Nov. 26, 1963, or a voltage variable capacitor as in U.S. Pat. No. 3,159,801 issued to W. C. Wiedemann on Dec. 1, 1964. Since both of the aforementioned methods utilize elements whose characteristics are inherently nonlinear to generate the phase modulation, both suffer from a lack of a linear relationship between the modulation signal applied and the phase deviation of the modulated radio frequency signal.

Several methods of phase modulation have been developed in hopes of achieving linear operation. One of these methods is the so-called Serrasoid Modulator. This modulator was described in an article by J. R. Day titled "Serrasoid F-M Modulator" in the October 1948 issue of *Electronics* at page 72. In this modulator, a crystal oscillator is utilized to generate a linear sawtoothed wave. This sawtoothed wave is coupled to the grid of a triode tube which is cathode-biased so that conduction begins half-way up the sawtooth. A pulse is generated every time the tube is driven into conduction by the sawtooth. The cathode-bias is varied by coupling the modulation voltage to the cathode of the tube. Therefore, the point of conduction is varied up and down the sawtooth. At this stage of the modulation process, the leading edges of the pulses generated by the tube are moving back and forth in time in accordance with the magnitude of the modulating voltage. At the same time, the trailing edges of the generated pulses are fixed. Therefore, not only is the leading edge moving back and forth in time but also the width or duration of each generated pulse is varying in accordance with the magnitude of the modulating voltage. It should be apparent that at this stage of the modulation process that a form of pulse duration modulation is being generated, which if integrated by a low pass filter would result in an amplitude modulated signal.

The pulses being generated are then coupled to a differentiator. The output of the differentiator is coupled to the grid of another triode tube which is normally biased into the conduction state. The bias on the second triode is set such that the differentiated leading edge of the generated pulse will drive the triode into the non-conduction state, thereby generating an output voltage pulse of constant magnitude and duration. Furthermore, the leading edge of the output voltage pulses are at the same place in time as the leading edges of the undifferentiated pulses. Since these output pulses are of constant magnitude and duration and of varying position in time, the output pulses are pulse position modulated. The output pulses are then coupled to a filter to recover the phase modulated sinusoidal signal.

The "Serrasoid F-M Modulator" described by J. R. Day has several failings. The first being that the modulation process requires several discrete steps thereby causing both a high parts count and a high cost. Furthermore, the modulator as described utilizes tubes which inherently cause the modulator to be large in size and to be incompatible with semiconductor circuits.

There are many possible methods of generating pulse position modulated signals. A simple method which exists in the prior art begins the modulation process by generating pulse width modulation. The pulse width modulated pulses are then differentiated. The output pulses of the differentiator which correspond to the time varying edge of the input pulse width modulated pulses are selected by a clipping or rectifying technique. Therefore, the selected pulses are varying in time and of constant magnitude and duration. It should be apparent that the pulse position modulator and the basic "Serrasoid F-M Modulator" are substantially the same. Therefore, most of the inherent shortcomings of the "Serrasoid F-M Modulator" are also shortcomings of the described pulse position modulator.

Accordingly, it is a general object of the present invention to provide a phase modulator or pulse position modulation circuit which is very linear in operation.

It is another object of the present invention to provide a pulse position or phase modulator circuit that produces the modulation in a small number of discrete steps thereby reducing the parts count and the cost.

It is yet another object of the present invention to provide a pulse position or a phase modulator circuit which is small in physical dimensions.

It is still another object to provide a phase modulator circuit which is directly compatible with semiconductor circuits.

SUMMARY OF THE INVENTION

In keeping with the principles of the present invention, the objects are accomplished with the unique combination of a particular composite signal and a trigger circuit which has a constant threshold level and output pulses of substantially constant duration. The composite signal, which is the summation of a low frequency modulating signal and a radio frequency periodic wave whose amplitude varies linearly with time between two predetermined values, is applied to the input of the trigger circuit. The threshold level of the trigger circuit is set at a fixed level greater than one-half the amplitude of the modulating signal but less than the amplitude of the radio frequency periodic wave minus one-half the amplitude of the modulating signal. Therefore, the variations of the amplitude of the modulating signal cause the apparent threshold level to vary in time along the linear portion of the radio frequency periodic wave. Therefore, since the apparent threshold level varies in time and the duration of the output pulse of the trigger circuit is substantially constant and independent of the amplitude variations of the modulating signal, the output pulses of the trigger circuit are pulse position modulated.

Phase modulation is generated by passing the pulse position modulated pulses, or in other words a phase modulated square wave, through a filter to select a phase modulated radio frequency wave of a particular frequency.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENT

Figure 1:
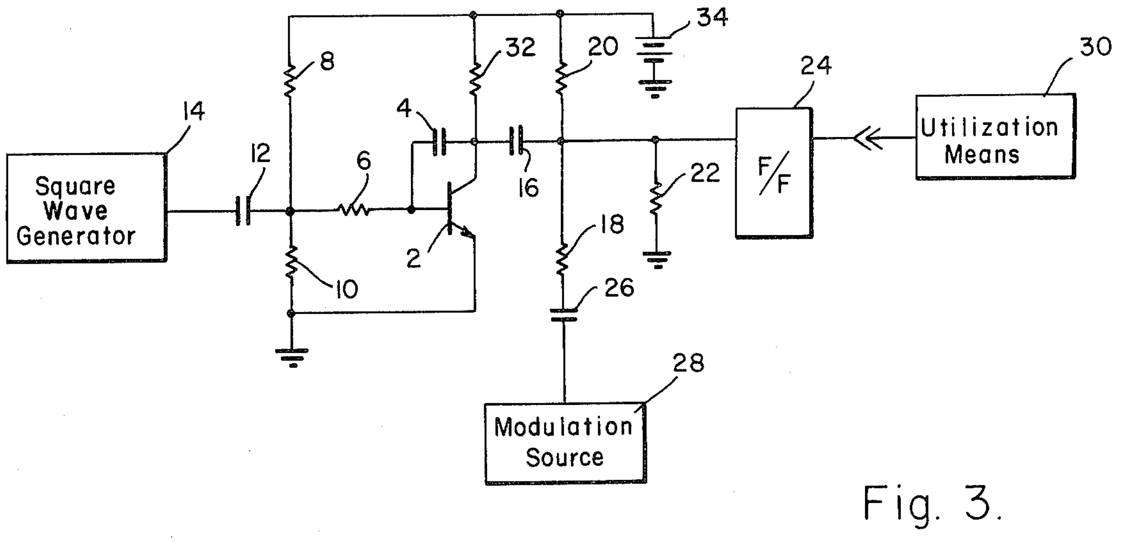
FIG. 1 is a schematic diagram of a modulator in accordance with the teachings of the present invention.

Referring more specifically to the drawings, FIG. 1 is a schematic diagram of a modulator circuit designed in accordance with the teachings of the present invention.

In FIG. 1, the modulator circuit includes a transistor 2 having a base, an emitter, and a collector. Capacitor 4 is connected from the base to the collector of transistor 2. A resistor 6 is also provided, with one end thereof connected to the base of transistor 2. The other end of resistor 6 is connected to the junction formed by one end of resistor 8, one end of resistor 10, and one end of capacitor 12. The other end of capacitor 12 is connected to the output of a square wave generator 14. The other ends of resistor 8 and resistor 10 are connected respectively to a positive source of direct current represented by the positive terminal of battery 34 and ground.

The two ends of capacitor 16 are connected respectively to the collector of transistor 2 and the junction formed by one end of resistor 18, one end of resistor 20, one end of resistor 22, and the toggle input of flip-flop 24. The other ends of resistors 20 and 22 are connected respectively to the positive terminal of battery 34 and ground. The two ends of capacitor 26 are connected respectively to the other end of resistor 18 and the output of modulation source 28. Either of the two outputs of flip-flop 24 is connected to utilization means 30. The two ends of resistor 32 are connected respectively to the collector of transistor 2 and the positive terminal of battery 34. The emitter of transistor 2 and the negative terminal of battery 34 are grounded.

In practice, the square-wave generator 14 can be either an astable multivibrator or a very stable sinusoid signal from a crystal oscillator connected to the input of a Schmitt trigger. Furthermore, the flip-flop 24 can be an integrated circuit such as Texas Instruments SN 7473. Also, the modulation source 28 can be any source of low frequency, typically in the audio range, time varying voltage. The utilization means 30 can be either a radio frequency pulse transmitter or a filter tuned to some odd harmonic of the frequency of the output signal of flip-flop 24.

Figure 2:
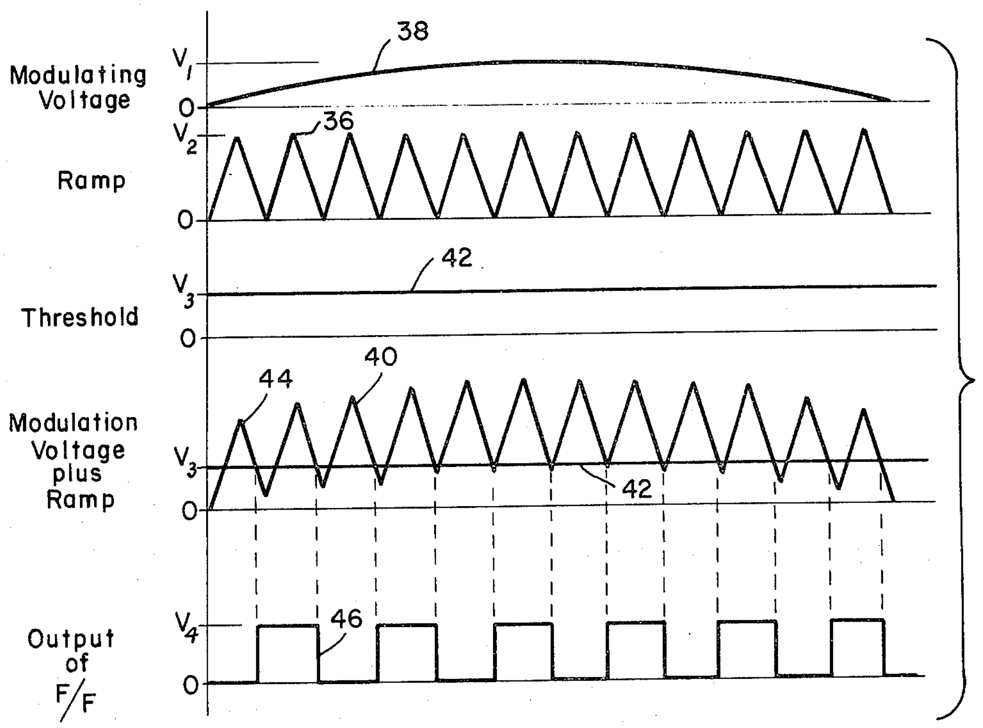
FIG. 2 is a graphic representation of typical waveforms at points in the circuit of FIG. 1.

Referring now to both FIG. 1 and 2, in operation that portion of the phase modulator circuit which comprises transistor 2, resistors 6, 8, 10 and 32, and capacitors 4 and 12, acts as a Miller integrator. When a square wave is applied to said Miller integrator by the square-wave generator 14, a very linear output ramp voltage 36 as shown in FIG. 2 appears at the collector of transistor 2. Typically, the frequency of the applied square wave and therefore the frequency of the corresponding ramp voltage 36 is in the megahertz range.

The ramp voltage 36 is then combined with a modulation voltage 38 which is supplied by modulation source 28 to form composite signal 40. Since the modulation voltage 38 is typically in the kilohertz frequency range or less, the modulation voltage 38 is represented in FIG. 2 as one half-cycle of the modulation voltage for many cycles of the ramp voltage 36.

The composite signal 40 is coupled to the toggle input of flip-flop 24. Said flip-flop has a fixed threshold level 42 and toggles only on the negative going segments 44 of each cycle of composite signal 40. Since the composite signal 40 is essentially the ramp voltage 36 riding on the modulation voltage 38, the threshold level 42 will vary relative to the ramp voltage 36 up and down the negative going segments 44 of the composite signal 40 in synchronism with the amplitude variations of the applied modulation voltage 38 as shown in FIG. 2. In other words, when the modulation voltage 38 increases in the positive direction, the threshold level 42 moves down said negative going segments 44 and the flip-flop 24 toggles later in time. Conversely, when the modulation voltage 38 decreases in the negative direction, the threshold level 42 moves up said negative going segments 44 and the flip-flop 24 toggles earlier in time.

Since the flip-flop 24 only toggles on the negative going segments 44, two things happen. First, the frequency of the output pulses of flip-flop 24 is one-half of the frequency of ramp voltage 36. Second, both the leading and trailing edge of each output pulse from flip-flop 24 is delayed or advanced in time substantially the same amount. Therefore, the output pulses 46 of flip-flop 24 will be of substantially constant amplitude and width and pulse position modulated. At this time, it should be pointed out that flip-flop 24 can be replaced by any trigger circuit or equivalent which has a fixed threshold, triggers only on either the positive going segments or negative going segments of composite signal 40, and generates an output pulse of substantially constant amplitude and width; i.e., a one shot.

The output pulses 46 which are pulse position modulated are coupled to utilization means 30. At this stage of the operation the character of the device or devices connected to the output flip-flop 24 have a significant impact on the character of the present invention. If the utilization means 30 is a radio frequency pulse transmitter or some other transmission means or medium, the output of the utilization device 30 comprises pulses which are pulse position modulated. Therefore, the present invention can be characterized as a pure pulse position modulation.

Figure 3:
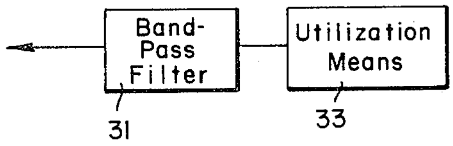
FIG. 3 is a block diagram of a bandpass filter and utilization device which may be substituted for the utilization device shown in FIG. 1.

In another embodiment, the utilization device 30 shown in FIG. 1 can be replaced by the bandpass filter 31 coupled to utilization means 33 shown in FIG. 3. In this case, the output pulses 46 of flip-flop 24 are applied to the input of bandpass filter 31. The bandpass filter 31 is tuned to an odd harmonic of the output pulses 46. The output of the filter is a phase modulated sinewave of a particular radio frequency whose phase varies in response to the modulating voltage 38. The utilization device 33 which is coupled to the output of filter 31 can be a radio frequency amplifier or multiplier or some other transmission means or medium. Therefore, the present invention can be characterized as a phase modulator.

It should be apparent that the linearity of the present invention is proportional to the linearity of the ramp voltage 36. It should be also clear that a sawtooth wave or equivalent would perform the same function as the ramp voltage 36 and still preserve the linearity. Furthermore, it should be apparent that if linearity is of little concern, then any periodic wave whose magnitude varies with time would perform the same function as the ramp voltage 36.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. An electronic circuit comprising:
   a source of radio frequency wave energy having a given frequency;
   a source of modulating energy having frequency components substantially lower than said given frequency;
   a means for additively combining said radio frequency wave energy and said modulating energy to form a composite signal;
   a trigger circuit with an input and an output; and
   a means for coupling said composite signal to said input of said trigger circuit, said trigger circuit further having a fixed threshold level which intersects said composite signal, said trigger circuit also being only responsive to every other crossing of the threshold by said composite signal, said trigger circuit further generating an output pulse of substantially constant amplitude and width in response to said crossings of the threshold by said composite signal.

2. An electronic circuit according to claim 1 wherein said source of radio frequency wave energy comprises a ramp generator.

3. An electronic circuit according to claim 2 wherein said trigger circuit comprises a flip-flop circuit with a toggle input and an output.

4. An electronic circuit according to claim 3 further comprising:
   a bandpass filter having at least an input and an output, said filter being tuned to an odd harmonic of the frequency of the output signal of said flip-flop; and
   a means for coupling said output of said flip-flop to the input of said filter.

5. The electronic circuit according to claim 3 wherein the threshold level of the flip-flop circuit is greater than one-half the amplitude of said modulating energy and less than the amplitude of said radio frequency wave energy minus one-half of the amplitude of the modulating energy.

6. An electronic circuit comprising:
   a means for generating periodic ramp energy of a given radio frequency;
   a source of modulating energy having frequency components substantially lower than said given frequency;
   a means for additively combining said periodic ramp energy and said modulating energy to form a composite signal;
   a trigger circuit with an input and an output;
   a means for coupling said composite signal to said input of said trigger circuit, said trigger circuit further having a fixed threshold level which intersects said composite signal, said trigger circuit also being only responsive to every other crossing of the threshold by said composite signal, said trigger circuit further generating an output pulse of substantially constant amplitude and width in response to said crossings of the threshold by said composite signal;
   a bandpass filter having at least an input and an output, said filter being tuned to an odd harmonic of the frequency of the output signal of said trigger circuit; and
   a means for coupling said output of said trigger circuit to the input of said filter.

* * * * *